(12) United States Patent
Onder et al.

(10) Patent No.: US 6,297,321 B1
(45) Date of Patent: Oct. 2, 2001

(54) EXTRUDABLE POLYURETHANE COMPOSITIONS AND METHODS

(75) Inventors: Kemal Onder, Brecksville; George Hunter Loeber, Elyria; Joseph J. Vontorcik, Broadview, all of OH (US)

(73) Assignee: The B. F. Goodrich Company, Brecksville, OH (US)

( * ) Notice: Subject to any disclaimer, the term of this patent is extended or adjusted under 35 U.S.C. 154(b) by 0 days.

(21) Appl. No.: 09/457,811

(22) Filed: Dec. 9, 1999

(51) Int. Cl.$^7$ ........................................ C08L 75/04
(52) U.S. Cl. ................................... 525/125; 525/131
(58) Field of Search ....................... 525/131, 125

(56) References Cited

U.S. PATENT DOCUMENTS

| | | |
|---|---|---|
| 3,751,520 | 8/1973 | Yasuda . |
| 4,581,406 | 4/1986 | Hedberg et al. ............ 524/520 |
| 5,039,745 * | 8/1991 | Riddle ....................... 525/101 |
| 5,098,982 | 3/1992 | Long, II ..................... 121/56 |
| 5,132,368 | 7/1992 | Chapman, Jr. et al. ...... 525/165 |
| 5,294,669 * | 3/1994 | Kawashima et al. ......... 525/129 |
| 5,830,947 | 11/1998 | Blong et al. ................ 525/187 |
| 5,891,538 | 4/1999 | Yamamoto et al. ......... 428/36.9 |

FOREIGN PATENT DOCUMENTS

| | | |
|---|---|---|
| 0 520 729 A1 | 12/1992 | (EP) . |
| 06172603 * | 6/1994 | (JP) . |

OTHER PUBLICATIONS

Priester, D., "Is Ysterday's Processing Additive Right for Today?", E.I. DuPont de Nemours and Comapny, Viton® Business Center, Presented at the Additives '96 Conference in Houston, Texas, Feb. 1996, 10 pages.

Priester, D., "Reducing Die Build–Up in Extrusion Applications", DuPont Dow Elastomers L.L.C., Wilmington, DE, USA, pp. 191–195 (Date Unknown).

* cited by examiner

*Primary Examiner*—Ana Woodward
(74) *Attorney, Agent, or Firm*—Thoburn T. Dunlap; Daniel J. Hudak; Valerie L. Calloway

(57) ABSTRACT

A fluoropolymer composition, containing one or more fluoropolymers, is used in a polyurethane composition to facilitate extrusion of the polyurethane composition. The addition of the fluoropolymer composition to the polyurethane composition typically results in less build up in an extruder than would be produced without the fluoropolymer composition.

16 Claims, No Drawings

EXTRUDABLE POLYURETHANE COMPOSITIONS AND METHODS

FIELD OF THE INVENTION

This invention relates to polyurethane compositions and methods of forming the compositions. In particular, the invention relates to polyurethane compositions that include at least one fluoropolymer and methods of making and using the compositions.

BACKGROUND OF THE INVENTION

Extruded polyurethane compositions, particularly extruded thermoplastic polyurethane compositions, are used in a variety of products. A portion of the thermoplastic polyurethane, however, tends to stick to the metal surfaces of the extruder and can crystallize. The crystallized polyurethane can build up within the extruder, particularly at points where the polymer resides for an extended period of time. Such build-up of the crystallized polyurethane can hinder the flow of the remainder of the polymer through the extruder. This crystallized polyurethane must be periodically removed from the interior of the extruder to reduce the pressure needed to maintain adequate throughput of the polyurethane composition. To remove the crystallized polyurethane, the extruder typically must be taken off-line and cleaned. This reduces the efficiency of the extrusion process and results in longer production times.

Additives, such as waxes, have been used to reduce build-up of crystallized polyurethane in the extruder. Waxes, however, tend to negatively alter the properties of the polyurethane, such as decreasing the strength and reducing the heat and chemical resistance of the polyurethane. In addition, the waxes tend to migrate to the surface of the extruded object, thereby modifying the surface properties of the extruded polyurethane composition.

SUMMARY OF THE INVENTION

Generally, the present invention relates to polyurethane compositions including at least one fluoropolymer. The fluoropolymer is typically added to enhance processability of the polyurethane composition. In particular, a fluoropolymer composition containing at least one fluoropolymer is combined with polyurethane, or the reactants that form the polyurethane, to facilitate extrusion of the polyurethane composition from an extruder. The addition of the fluoropolymer composition to the polyurethane composition typically results in less build up in the extruder than would be produced without the addition of the fluoropolymer composition.

One embodiment of the invention is a polyurethane composition that includes (a) polyurethane and (b) a fluoropolymer composition having at least one fluoropolymer. The fluoropolymer composition is present in the polyurethane composition in an amount that is effective to produce less build-up of polyurethane within an extruder than would be produced using the same polyurethane composition without the fluoropolymer composition. The polyurethane composition optionally includes a carrier for the fluoropolymer composition. In one embodiment, the fluoropolymer composition is at least 0.002 wt. % of the total polyurethane composition.

Another embodiment of the invention is a polyurethane article formed using this polyurethane composition. The polyurethane article can also include other components made from different materials.

A further embodiment of the invention is a method of making a polyurethane article by extruding the polyurethane composition described above. The method can optionally include other process steps such as, blowing or molding the polyurethane composition after extruding. When extruding the polyurethane composition, the polyurethane can be introduced into the extruder, or the reactants can be introduced into the extruder to form the polyurethane within the extruder. The fluoropolymer composition can be added to the polyurethane composition (e.g., the polyurethane or the components that are reacted to form the polyurethane) prior to introduction of the polyurethane into the extruder or through a port positioned at a point along the length of the extruder. Typically, the fluoropolymer composition is added prior to a position in the extruder where significant build-up of material occurs without the fluoropolymer composition.

DESCRIPTION OF THE PREFERRED EMBODIMENT

The present invention is applicable to extrudable and extruded polyurethane compositions. In particular, the present invention is directed to extrudable polyurethane compositions, including extrudable thermoplastic polyurethane compositions, and products made from the compositions, as well as methods of extruding the compositions.

A polyurethane composition for extruding includes polyurethane (or reagents used to form the polyurethane or a combination of polyurethane and reagents), a fluoropolymer composition, and, optionally, a carrier for the fluoropolymer composition. The polyurethane is typically a thermoplastic polyurethane and the carrier is usually a polymer carrier that can facilitate the accurate addition and uniform dispersion of relatively small amounts of the fluoropolymer composition. When extruded, the polyurethane composition can be used to form polyurethane articles, either as extruded or by further processing, such as, for example, cutting, blowing, or molding. These polyurethane articles can be composite articles and include portions formed by other methods or using other materials.

The term "polyurethane composition" refers to a composition containing polyurethane, reagents used to form the polyurethane, or a combination thereof and can refer to this composition prior to extrusion, within the extruder, or after extrusion. When referring to the weight percentage of a particular material in the polyurethane composition based on the total weight of the polyurethane composition, the polyurethane composition includes any polyurethane, any unreacted reagents used to make the polyurethane, the fluoropolymer composition, optional carrier, and all other additives.

The components of the polyurethane composition can be combined to form the polyurethane composition prior to introduction into the extruder or they can be combined in situ within the extruder. The fluoropolymer composition is typically provided in an amount sufficient to produce less build-up of polyurethane (e.g., crystallized polyurethane) in the extruder (e.g., along the metal surface of the extruder) than would be found using the same polyurethane composition without the fluoropolymer composition. For purposes of this comparison, the amount of build-up for a given amount of material that has been extruded can be determined in a variety of ways including, for example, comparing the thickness of the build-up, the surface area of the extruder covered by the build-up, and/or the weight of the build-up for a given amount of polyurethane composition extruded at the same conditions. For example, for a given extruder, extruder configuration, extrusion conditions (e.g., extrusion temperature(s), pressure(s), and speed(s)), and period of time, the addition of a fluoropolymer composition can reduce the build-up by at least 10%. Extrusion conditions and amounts of fluoropolymer composition can be chosen so that build-up can be reduced by at least 50%, and even by at least 80% or more. In at least some instances, the addition of a fluoropolymer composition can prevent (e.g., reduce by about 100%), what would otherwise be significant, build-up for a given set of conditions and period of time. Reduction in build-up can be measured using one or more measurement criteria (e.g., the thickness, weight, or surface area of the build-up described above). The specified percentage of reduction in build-up is achieved if there is the appropriate reduction in build-up according to at least one measurement criterion, even if that reduction percentage is not met when using another measurement criteria.

For example,, a polyurethane composition without a fluoropolymer composition can be extruded through a 2½" Killion single screw extruder (Killion Extruder, Inc., Cedar Grove, N.J.) fitted with a barrier screw at a 30:1 length/diameter ratio, a temperature setting of about 200 to 225° C., a screw speed of about 30 to 40 rpm (revolutions per minute), and an extrusion pressure of about 700 to 2200 psi (about 5 MPa to 16 MPa). After two hours of extruding the polyurethane composition, the extruder can be taken apart and the amount of material measured according to a selected measurement criterion (e.g., the thickness, weight, or surface area of the build-up). This same process can be repeated using the same extruder and extrusion conditions (e.g., time, temperature, screw speed, and pressure ranges), but using a polyurethane composition including a fluoropolymer composition. The measurements obtained for the two samples can be compared to determine the percent reduction in build-up due to the addition of the fluoropolymer composition. This comparison can also be performed using other extrusion equipment and extrusion conditions.

It is thought that the addition of the fluoropolymer composition and the optional carrier reduces interaction between the polyurethane and the metal walls of the extruder. This interaction, if sufficiently long, can result in crystallization of the polyurethane which contributes to the build-up of material within the extruder. This built-up material must be removed on a regular basis to provide adequate through-put of material without applying excessive pressure which could damage the extruder. The addition of the fluoropolymer composition typically results in less build-up and can provide greater efficiency due to, for example, less frequent or faster cleaning time for the extruder.

Uses of Fluoropolymers in Extrusion

Each type of polymer provides different challenges to processing technology as each type of polymer has its own characteristics. Melt fracture and build-up of material around the die (i.e., the opening through which the polymer material is extruded) are challenges faced when extruding polyolefins, such as poly(ethylene), and polyamides, such as nylon. In contrast, extrusion of polyurethanes typically results in a build-up of crystalline or semi-crystalline material within the extruder barrel, and not at the die. The term "extruder", as used herein, excludes the die portion (i.e., the opening through which the extruded material is expelled) of the extrusion equipment. These different processing challenges are, at least in part, a result of the differences in chemistry and physical properties of various types of polymers.

Fluoropolymers have been used as a processing aid for the extrusion of polyolefins and polyamides. The fluoropolymers are reported as reducing melt fracture and die build-up for these polymers, as described, for example, in U.S. Pat. No. 5,132,138, incorporated herein by reference. Melt fracture is typically a result of high shear stresses generated as the polyolefin or polyamide material is conveyed through the extruder. Build-up occurs at the opening (i.e., die) through which the polymer leaves the extruder. It is thought that at least a portion of the build-up occurs due to oxidation, degradation, crosslinking, or other reactions of the polymer as the polymer exits the extruder and is exposed to the ambient atmosphere. The metal surface of the die can facilitate the reaction of the polymer.

In contrast, a concern for extrusion processing of polyurethane compositions is the build-up of polyurethane (typically, crystallized polyurethane) within the extruder (e.g., the barrel). Melt fracture and die build-up are not as important. It is found that the addition of a fluoropolymer composition reduces build-up of crystallized polyurethane within the extruder. The build-up of crystallized polyurethane typically occurs at points within the extruder where the residence time of the polyurethane is relatively long, such as in portions of the extruder with expanded volume. At these points in the extruder, it is believed that contact of the polyurethane composition with the metal of the extruder results in crystallization or solidification of portions of the polyurethane. In particular, the polyurethane can stick to the metal surface and crystallize. It is thought that the addition of the fluoropolymer composition reduces the bonding forces and the contact time between the polyurethane and the metal surface, thereby reducing the likelihood that the polyurethane will crystallize. It is also thought that, at least in some instances, a carrier, such as poly(ethylene), can further contribute to reducing the bonding forces between the polyurethane and the metal surface.

Polyurethanes

Polyurethanes are generally prepared by combining and reacting a) at least one polyol intermediate, such as a hydroxyl terminated polyester, a hydroxyl terminated polyether, a hydroxyl terminated polycarbonate, a hydroxyl terminated polycaprolactone, or mixtures thereof, with b) at least one polyisocyanate and, optionally, c) at least one chain extender. These reactants can generate a polyurethane within an extruder. Suitable extrudable polyurethanes include thermoplastic polyurethanes, but can also include other polyurethanes, such as thermosetting polyurethanes. Polyurethanes that benefit from the addition of the fluoropolymer include those having a Shore (A) hardness of at least 90 after being extruded and cooled into the finished product.

The reaction that forms the polyurethane can be complete before the polyurethane is introduced into the extruder and/or before combination with the fluoropolymer composition. Suitable commercial polyurethanes include, for example, the Estane® series of polyurethanes available from the BFGoodrich Company (Charlotte, N.C.), such as, for example Estane® 58157, 58142, 58212, 58215, 58887, and 58144.

Alternatively, the reactants to produce the polyurethane can be added into an extruder and the reaction performed in situ. For example, the polyol(s), the polyisocyanate(s), and the chain extender(s), if present, can be combined within the extruder and reacted as the material flows through the extruder. Polyurethanes that benefit from the addition of a fluoropolymer composition include those having polyol blocks (i.e., regions of the polyurethane that are generated by addition of a hydroxyl terminated polyester, polyether, polycarbonate, or polycaprolactone) with number average molecular weights of at least 2,000 and, generally, at least 3,000. These polyurethanes typically have greater phase separation of the constituent blocks which makes crystallization less difficult.

Hydroxyl Terminated Polyesters

Polyurethanes can be formed using hydroxyl terminated polyesters. Suitable hydroxyl terminated polyesters for forming polyurethanes are generally polyesters, often linear polyesters, having a number average molecular weight, $M_n$, of at least 500 and typically no more than 10,000 to provide the polyurethane with a distribution of hard and soft segments. The number average molecular weight of the hydroxyl terminated polyester is typically in the range of about 700 to about 5,000, and often is in the range of about 700 to about 4,000. The number average molecular weight can be determined, for example, by assay of the number of terminal functional groups for a given weight of polymer. Suitable hydroxyl terminated polyesters generally have an acid number of 1.3 or less and typically 0.8 or less. The acid number refers to the number of milligrams of potassium hydroxide needed to neutralize one gram of the hydroxyl terminated polyester. Suitable hydroxyl terminated polyesters are commercially available from companies such as, for example, Witco Corp. (Perth Amboy, N.J.), Inolex Chemical Co. (Philadelphia, Pa.), and Ruco Polymer Corp. (Hicksville, N.Y.).

The hydroxyl terminated polyester polymers can be produced by, for example, (1) an esterification reaction of one or more dicarboxylic acids or anhydrides using one or more glycols or (2) a transesterification reaction of one or more esters of dicarboxylic acids using one or more glycols. Mole ratios generally in excess of more than one mole of glycol to acid, anhydride, or ester are preferred so as to obtain linear chains having a preponderance of terminal hydroxyl groups.

Suitable dicaboxylic acids for preparing a hydroxyl terminated polyester intermediate include aliphatic, cycloaliphatic, and aromatic dicarboxylic acids. A single dicarboxylic acid or a combination of dicarboxylic acids can be used. Typically, the dicarboxylic acids have a total of from 4 to 15 carbon atoms. Examples of suitable dicarboxylic acids include succinic, glutaric, adipic, pimelic, suberic, azelaic, sebacic, dodecanedioic, isophthalic, terephthalic, and cyclohexane dicarboxylic acids, and the like. Anhydrides of the above dicarboxylic acids, such as phthalic anhydride, tetrahydrophthalic anhydride, and the like, can also be used. Adipic acid is a commonly used dicarboxylic acid.

If the transesterification route for formation of the hydroxyl terminated polyester is utilized, esters of the dicarboxylic acids described above can be used. These esters typically include an alkyl group, usually having 1 to 6 carbon atoms, in place of the acidic hydrogen of the corresponding acid functionalities.

The glycols which are reacted to form the hydroxyl terminated polyester intermediate can be aliphatic, aromatic, or combinations thereof. The glycols typically have a total of from 2 to 12 carbon atoms. Suitable glycols include, for example, ethylene glycol, 1,2-propanediol, 1,3-propanediol, 1,3-butanediol, 1,4-butanediol, 1,5pentanediol, 1,6-hexanediol, 2,2-dimethyl- 1,3-propanediol, 1,4-cyclohexanedimethanol, decamethylene glycol, dodecamethylene glycol, and the like. Commonly used glycols are 1,4-butanediol and 1,6-hexanediol.

Hydroxyl Terminated Polyethers

Hydroxyl terminated polyethers can also be used to form polyurethanes. Suitable hydroxyl terminated polyether intermediates are polyether polyols derived from a diol or polyol having a total of from 2 to 15 carbon atoms. For example, an alkyl diol or glycol can be reacted with an ether, such as an alkylene oxide having from 2 to 6 carbon atoms. Suitable alkylene oxides include, for example, ethylene oxide, propylene oxide, or mixtures thereof. Suitable hydroxyl terminated polyethers are commercially available from companies such as, for example, E.I. duPont de Nemours Co., Inc. (Wilmington, Del.), BASF Corp. (Parsippany, N.J.), and Great Lakes Chemical Corp. (Lafayette, Ind.).

As an example, a hydroxyl terminated polyether intermediate can be produced by first reacting propylene glycol with propylene oxide followed by subsequent reaction with ethylene oxide. Primary hydroxyl groups resulting from ethylene oxide are generally more reactive than secondary hydroxyl groups. Suitable polyether polyols include, for example, poly(ethylene glycol) which can be formed by reacting ethylene oxide with ethylene glycol, poly (propylene glycol) which can be formed by reacting propylene oxide with propylene glycol, poly(propylene-ethylene glycol) which can be formed by reacting propylene oxide and ethylene oxide with propylene glycol, poly (tetramethylene glycol) (PTMG) which can be formed by reacting water with tetrahydrofuran (THF). Other suitable polyether polyols include polyamide adducts of an alkylene oxide including, for example, ethylenediamine adduct which is the reaction product of ethylenediamine and propylene oxide, diethylenetriamine adduct which is the reaction product of diethylenetriamine with propylene oxide, and similar polyamide type polyether polyols. Co-polyethers can also be utilized in the current invention. Typical co-polyethers include the reaction product of THF and ethylene oxide or THF and propylene oxide. Suitable co-polyethers are available from BASF Corp. (Parsippany, N.J.) as Poly THF B, a block copolymer, and poly THF R, a random copolymer.

Suitable hydroxyl terminated polyether intermediates generally have a number average molecular weight, as determined by assay of the terminal functional groups, of at least 500 and typically no more than 10,000 to produce a desired ratio of soft and hard segments of the polyurethane. Typically, the number average molecular weight of the hydroxyl terminated polyether ranges from about 500 to about 5,000. Often the number average molecular weight of the hydroxyl terminated polyether ranges from about 700 to about 3,000.

Hydroxyl Terminated Polycarbonates

Hydroxyl terminated polycarbonates can be used to form polyurethanes. Suitable hydroxyl terminated polycarbonates are commercially available from companies such as, for example, C.P. Hall Co. (Chicago, Ill.). Suitable hydroxyl terminated polycarbonates can be prepared by reacting a glycol with a carbonate. U.S. Pat. No. 4,131,731, incorporated herein by reference, describes hydroxyl terminated polycarbonates and their preparation. Such polycarbonates are typically linear. Suitable glycols for the preparation of hydroxyl terminated polycarbonates include aliphatic and cycloaliphatic diols containing 4 to 40, and typically 4 to 12, carbon atoms and polyoxyalkylene glycols containing 2 to 20 alkoxy groups per molecule with each alkoxy group containing 2 to 4 carbon atoms. Suitable glycols include, for example, aliphatic diols containing 4 to 12 carbon atoms, such as 1,4-butanediol, 1,4-pentanediol, neopentyl glycol, 1,6-hexanediol, 2,2,4-trimethyl- 1,6-hexanediol, 1,10-decanediol, hydrogenated dilinoleylglycol, hydrogenated dioleylglycol, and cycloaliphatic diols, such as 1,3-cyclohexanediol, 1,4-dimethylolcyclohexane, 1,4-cyclohexanediol, 1,3-dimethylolcyclohexane, 1,4-endomethylene-2-hydroxy-5-hydroxymethyl cyclohexane, and polyalkylene glycols. A single glycol or a mixture of glycols can be used to form the hydroxyl terminated polycarbonate intermediate depending, at least in part, on the properties desired in the finished product.

The number average molecular weight of the hydroxyl terminated polycarbonates is generally at least about 500 and typically not more than 10,000. Suitable hydroxyl terminated polycarbonates have a number average molecular weight in the range of 500 to 3,000.

Hydroxyl Terminated Polycaprolactones

Hydroxyl terminated polycaprolactones can also be used to form polyurethanes. Suitable hydroxyl terminated polycaprolactones are commercially available from companies such as, for example, Union Carbide Corp. (Danbury, Conn.). Hydroxyl terminated polycaprolactones can be formed by reaction of a caprolactone with a glycol. Suitable caprolactones include ∈-caprolactone and methyl ∈-caprolactone. Suitable glycols include, for example, ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. Methods for the preparation of hydroxyl terminated polycaprolactones are generally known.

Polyisocyanates

Polyisocyanates are another component used in the formation of polyurethanes. Suitable polyisocyanates are commercially available from companies such as, for example, Dow Chemical Co. (Midland, Mich.), BASF Corp. (Parsippany, N.J.), Bayer AG (Leverkusen, Germany), and ICI Americas, Inc. (Wilmington, Del.). Suitable polyisocyanates include aromatic diisocyanates, aliphatic diisocyanates, and polyisocyanates with more than two isocyanate groups. Examples of suitable aromatic diisocyanates include para,para'-4,4'-methylenebis-(phenyl isocyanate) (MDI), ortho,para'-4,4'-methylenebis-(phenyl isocyanate), m-xylylene diisocyanate (XDI), m-tetramethyl xylylene diisocyanate (TMXDI), phenylene-1,4-diisocyanate (PPDI), 1,5-naphthalene diisocyanate (NDI), diphenylmethane-3,3'-dimethoxy-4,4'-diisocyanate (TODI), and toluene diisocyanate (TDI). Examples of suitable aliphatic diisocyanates include isophorone diisocyantate (IPDI), 1,4-cyclohexyl diisocyanate (CHDI), hexamethylene diisocyanate (HDI), 1,6-diisocyanato-2,2,4,4-tetramethyl hexane (TMDI), 1,3-bis(isocyanato-methyl) cyclohexane (HXDI), 1,10-decane diisocyanate, and trans-dicyclohexylmethane diisocyanate (HMDI). One suitable polyisocyanate with more than two isocyanate groups is polymethylene polyphenylisocyanate (PMDI). A commonly used diisocyanate is 4,4'-methylenebis(phenyl isocyanate) (MDI). A single polyisocyanate or a combination of polyisocyanates can be used. The addition of a fluoropolymer composition to a polyurethane is particularly useful when the polyisocyanate used to form the polyurethane has a high melting point (e.g., 200° C. or more). These polyurethanes have a greater tendency to crystallize in the extruder resulting in layer build-ups within the extruder.

Chain Extenders

Chain extenders can be added to the other reactants to increase the molecular weight of the polyurethane, although some polyurethanes are formed without chain extenders. Suitable chain extenders include, for example, lower aliphatic or short chain glycols having about 2 to about 10 carbon atoms. Preferred chain extenders are linear aliphatic diols with hydroxyl groups at each end of the molecule. Examples of suitable chain extenders include diethylene glycol, propylene glycol, dipropylene glycol, 1,4-butanediol, 1,6-hexanediol, 1,3-butanediol, 1,5-pentanediol, 1,4-cyclohexanedimethanol hydroquinone di(hydroxyethyl) ether, neopentyl glycol, and the like. A commonly used chain extender is 1,4-butanediol. A single chain extender or a combination of chain extenders can be used. Commercial sources of suitable chain extenders include, for example, Lyondell Chemical Corp. (Houston, Tex. and BASF Corp. (Parsippany, N.J.).

When a chain extender is used, at least about 0.1 moles of chain extender per mole of polyol (i.e., hydroxyl terminated polyester, polyether, polycarbonate, and/or polycaprolactone intermediate) is used. In some instances, twenty or more moles of chain extender can be used per mole of polyol. Typically about 0.5 to 20 moles of chain extender per mole of polyol is used.

Formation of the Polyurethane

The polyurethane is generally made from the reaction of a) one or more hydroxyl terminated polyester, polyether, polycarbonate, or polycaprolactone intermediates, b) one or more polyisocyanates, and, optionally, c) one or more chain extenders. The formation of the polyurethane is typically a simultaneous co-reaction of the hydroxyl terminated intermediate(s), polyisocyanate(s), and, if included, chain extender(s) to produce a high molecular weight polyurethane. In a one-shot polymerization process, which generally occurs in situ in an extruder, a simultaneous reaction occurs between the two or three components (e.g., the hydroxyl intermediate(s), the polyisocyanate(s), and, if included, the chain extender(s)). The reaction is generally initiated at temperatures of from about 100° C. to about 140° C.; however, because the reaction is exothermic, the reaction temperature generally increases to about 170° C. to 270° C. Polyurethanes can decompose at temperatures above 270° C.

The weight average molecular weight of the polyurethane is generally at least about 50,000 and typically no more than 500,000, as measured by gel permeation chromatography (GPC). Typically, the polyurethane has a weight average molecular weight in the range of about 90,000 to about 250,000. The mole ratio of diisocyanate functional groups (from the polyisocyanate) to hydroxyl functional groups (from the hydroxyl terminated polyester, polyether, polycarbonate, and/or polycaprolactone intermediates and, if included, chain extender) is generally at least 0.95:1 and typically no more than about 1.10:1. A suitable mole ratio of diisocyanate:hydroxyl groups is in the range of about 0.96:1 to about 1.02:1 and often in the range of about 0.97:1 to about 1.005:1.

Fluoropolymer Composition

A fluoropolymer composition is provided in the polyurethane composition to facilitate processing of the polyurethane through an extruder, as described above. The fluoropolymer composition includes one or more fluoropolymers. The fluoropolymer composition is provided in the polyurethane composition in an amount effective to produce less build-up of polyurethane in the extruder than the same polyurethane composition without the fluoropolymer composition. Typically, the fluoropolymer composition and/or optional carrier prevent or reduce crystallization of the polyurethane in the extruder.

Preferably, the fluoropolymer(s) included in the fluoropolymer composition are melt processible with the polyurethane in an extruder. For example, suitable fluoropolymers are polymers that contain fluorine, are thermoplastic, and melt or flow under the extrusion conditions. Because polyurethanes typically decompose at temperatures of 260° C. to 270° C. or beyond, preferred fluoropolymers melt in the extruder at a temperature of no more than about 260° C. or 270° C. At least in some instances, the selected fluoropolymer or fluoropolymers melt in the extruder at a temperature of 200° C. to 220° C. or less. In some embodiments, the fluoropolymer composition can, with or without the carrier, form a film along at least a portion of the extruder to facilitate movement of the polyurethane composition through the extruder.

Suitable fluoropolymers for the fluoropolymer composition include, for example, vinylidene fluoride copolymers and tetrafluoroethylene copolymers. Examples of such fluoropolymers include copolymers of a) vinylidene fluoride and b) at least one of hexafluoropropylene, chlorotrifluoroethylene, 1-hydropentafluoropropylene, and 2-hydropentafluoropropylene. Other suitable fluoropolymers include copolymers of a) vinylidene fluoride, b) tetrafluoroethylene, and c) at least one of hexafluoropropylene, chlorotrifluoroethylene, 1-hydropentafluoropropylene, and 2-hydropentafluoropropylene. Suitable fluoropolymers also include copolymers of a) tetrafluoroethylene and b) at least one of hexafluoropropylene (also known as "FEP polymers"), ethylene, and propylene, optionally, with c) an amount of vinylidene fluoride. Other suitable fluoropolymers are described in U.S. Pat. No. 5,132,368, incorporated herein by reference. Useable, commercially available fluoropolymer compositions include the Viton™ series of additives from E.I. duPont de Nemours and Company (Wilmington, Del.) including, for example, Viton™ Free Flow SC, as well as Product Nos. 2973 PA PEC and 2965 PA PEC (corresponding to 5 wt. % and 3 wt. % Viton™ product, respectively, in linear low density polyethylene) from Southwest Chemical Services (Seabrook, Tex.).

The fluoropolymers of the fluoropolymer composition can include polar end groups to facilitate interaction with the metal surfaces of the extruder. Examples of such end groups include —COF, —SO$_2$F, —OSO$_3$M, —SO$_3$M, —COOR, and —COOM, where R is a C$_{1-3}$ alkyl group and M is hydrogen, a metal cation, or a quaternary ammonium cation. Suitable fluoropolymers include those having a weight average molecular weight of at least 10,000 and a fluorine to carbon ratio of at least 1:2 and, often, at least 1:1.5. The high fluorine content facilitates the formation of low surface energy films on the surface of the extruder by the fluoropolymer composition and/or optional carrier.

Preferably, the fluoropolymer composition is non-reactive, under the extrusion conditions, with the polyurethane and, if added before the polyurethane is completely formed, non-reactive with the components that react to form the polyurethane. Non-reactive, in this context, means that no more than 0.1 wt. %, and preferably, no more than 0.01 wt. % of the final polyurethane composition is a reaction product between the fluoropolymer composition and the polyurethane or any of the components that form the polyurethane (i.e., the polyol(s), the polyisocyanate(s), and, if included, the chain extender(s)).

A minimum amount of fluoropolymer composition is typically needed to provide the desired properties. Addition of the fluoropolymer composition may adversely affect some properties of the resulting polyurethane composition, particularly surface properties, such as bondability to other surfaces. Accordingly, there may be a limit to the amount of fluoropolymer composition that can be added to the polyurethane composition to obtain desired properties. Generally, the polyurethane composition includes at least about 0.002 wt. % fluoropolymer composition, based on the total weight of the polyurethane composition. Typically, the amount of fluoropolymer composition added to the polyurethane composition is about 3 wt. % or less, based on the total weight of the polyurethane composition. Preferably, the amount of fluoropolymer composition in the polyurethane composition is in the range of 0.01 to 1 wt. %, based on the total weight of the polyurethane composition.

Carriers

The fluoropolymer composition can be introduced, via a carrier, into the polyurethane or into the components that, upon reaction, form the polyurethane. In particular, a carrier can be useful if the amount of the fluoropolymer composition would otherwise be too small to add reproducibly, particularly on a bulk processing scale. The fluoropolymer composition can be combined with a carrier in a known concentration. The fluoropolymer composition can be solvated in, dispersed in, or otherwise combined with the carrier.

The carrier is typically a polymer. Preferably, the carrier is non-reactive, under the extrusion conditions, with the polyurethane, the fluoropolymer composition, and, if added before the polyurethane is completely formed, with the components that react to form the polyurethane. Non-reactive, in this context, means that no more than 0.1 wt. %, and preferably, no more than 0.01 wt. % of the final polyurethane composition is a reaction product between the carrier and the polyurethane, the fluoropolymer composition, and any of the components that form the polyurethane (i.e., the polyol(s), the polyisocyanate(s), and, if included, the chain extender(s)).

Preferably, a carrier is selected that melts or flows, but does not decompose, under the extrusion conditions. In some embodiments, the selected carrier melts in the extruder at a temperature of no more than about 260° C. or 270° C. (the typical decomposition temperature of polyurethanes). At least in some instances, a carrier is used that melts in the extruder at a temperature of 200° C. to 220° C. or less.

In at least some instances, a carrier is selected that contributes to the elimination or reduction of build-up in the extruder. The carrier, alone or in combination with the fluoropolymer composition, can generate a film within the extruder and/or lower the surface energy between the extruder surface and the polyurethane.

Suitable carriers include polyolefins, polyesters, polyamides, styrene-acrylonitrile polymers, polyurethanes, and polystyrene. Linear low density polyethylene (LLDPE) is one specific example of a suitable carrier. Examples of commercial fluoropolymer compositions in a carrier include Product Nos. 2973 PA PEC and 2965 PA PEC (corresponding to 5 wt. % and 3 wt. % Viton™ product in linear low density polyethylene) from Southwest Chemical Services (Seabrook, Tex.). A single carrier or a combination of carriers can be used.

When a carrier is used, the fluoropolymer composition is typically at least about 1 wt. %, and generally no more than about 15 wt. %, of the combined weight of the fluoropolymer composition and carrier. Typically, the amount of the fluoropolymer composition is about 2 to 10 wt. % of the combined weight of the fluoropolymer composition and carrier.

When a carrier is used, the carrier is generally at least about 0.25 wt. %, and typically no more than about 10 wt. %, of the total weight of the polyurethane composition. For example, the carrier can be about 0.5 to 2 wt. % of the total weight of the polyurethane composition.

Other Additives

Other conventional additives can be included in the polyurethane composition. Among these other conventional additives are, for example, antioxidants, antiozone agents, antihydrolysis agents, chain terminators, extrusion aids, and UV stabilizers. These additives and their use in polyurethane compositions are generally known.

Antioxidants typically prevent or terminate oxidation reactions that result in degradation of articles made from the polyurethane composition over the lifetime of the article. Typical antioxidants include ketones, aldehydes, and aryl amines, as well as phenolic compounds. Examples of suitable commercial antioxidants include Irganox™ 1010, Irganox™ 1098, Irganox™ 565, and Irganox™ 1035 (Ciba-Geigy Corp., Ardsley, N.Y.).

Antiozone agents prevent or reduce damage caused by ozone and antihydrolysis agents prevent or reduce damage by water and other hydrolyzing compounds. Examples of suitable antiozonants include p-phenylenediamine derivatives. Antihydrolysis agents include, for example, Stabaxol™ P and Stabaxol™ P-200 (Rhein Chemie, Trenton, N.J.).

Extrusion aids facilitate movement of the polyurethane through the extruder. Waxes, such as Wax E (Hoechst-Celanese Corp., Chatham, N.J.) or Acrawax™ (Lonza Inc., Fair Lawn, N.J.), are suitable extrusion aids. Suitable UV stabilizers include polyethers and Ketamine™ P (Ciba-Geigy Corp., Ardsley, N.Y.).

Chain terminators are used to control molecular weight. Suitable chain terminators include, for example, monoalcohol compounds having 8 or more carbon atoms.

Extrusion

The polyurethane composition can be formed and/or processed using a variety of techniques, including extrusion. For extrusion, a variety of processing devices can be used including, but not limited to, single and twin screw extruders. Typically, the polyisocyanate(s); the hydroxyl terminated polyester, polyether, polycarbonate, and/or polycaprolactone intermediate(s); and the optional chain extender(s) are combined and heated within the extruder, as described above. The reaction of these components proceeds as the material advances along the extruder. Alternatively, the polyisocyanate(s) and the hydroxyl terminated polyester, polyether, polycarbonate, and/or polycaprolactone intermediate(s) can be combined and reacted. The optional one or more chain extenders can be added later, for example, via a port in the extruder. Although individual batches can be formed, extrusion processes often allow continuous processing by metered addition of the components into the extruder.

Any of the additives, including the fluoropolymer composition and optional carrier, can be added with the components that form the polyurethane. Typically, these additives do not interfere with the reaction of those components, unless the additive is specifically included to react with those components (i.e., the additive is covalently incorporated into the polyurethane).

Alternatively, any of the additives can be added into the extruder further downstream where the polyurethane is at least partially formed. Extruders typically include one or more ports along the length of the extruder for introduction of materials. For example, the fluoropolymer composition and optional carrier can be added at a point in the extruder where at least 75% of the reaction is complete (i.e., where at least 25 wt. % of reactants, based on the original weight of all of the reactants that form the polyurethane, are unreacted). In some embodiments, the fluoropolymer composition and optional carrier are added at a point in the extruder where at least 90% or 95% of the reaction is complete.

The additives, whether added in with the polyurethane reactants or later, can be mixed into the polyurethane composition by an extruder. This composition would continue, for example, through the extruder until it is pushed out of the extruder through a die. The composition can be cut, cooled, blown, molded, or otherwise processed to form polyurethane articles.

Modifications of this process can be made. For example, instead of adding components for forming the polyurethane into the extruder, a previously formed polyurethane can be introduced into the extruder. The fluoropolymer composition can be added with the polyurethane or further downstream along the extruder.

EXAMPLES

Comparative Example 1

A polyurethane similar to the commercially available Estane® 58157 (BFGoodrich Company, Charlotte, N.C.) was extruded through a 2½" Killion single screw extruder (Killion Extruders, Inc., Cedar Grove, N.J.) fitted with a barrier screw at 30:1 length/diameter ratio to form tubing. Temperature within the extruder was about 200 to 225° C., screw speed was about 35 rpm (revolutions per minute), and extrusion pressure was in the range of 700 to 2200 psi (about 5 MPa to 16 MPa). Occasionally, white chunks were observed embedded in the walls of the tubing. After two hours, the extruder was taken apart and a solid white ring of built up material around a braker plate (used to hold a filter) was removed. The amount of material removed was about 47.3 g. This material was analyzed using differential scanning calorimetry to give a 257.6° C. melting point. The melting point is much higher than the typical operating temperature of the extruder. The extruded polyurethane had a melting point of 219.1° C.

Example 1

The same polyurethane as in Comparative Example 1 was extruded through the same screw extruder. Prior to extrusion, 2 wt. % (based on the weight of the polyurethane) of Product No. 2973 PA PEC from Southwest Chemical Services (Seabrook, Tex.) was added to the polyurethane. Product No. 2973 PA PEC contains 5 wt. % fluoropolymer composition and 95 wt. % linear low density polyethylene (LLDPE). After two hours, the extruder was taken apart. There was no measurable amount of build up of material within the extruder, corresponding to about 100% reduction in the amount of build up by the addition of the fluoropolymer. In addition, there were no chunks of white material found in the extruded tubing The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A polyurethane composition comprising:
   (a) polyurethane;
   (b) a fluoropolymer composition in an amount of about 0.002 to about 3 wt. % based on the total weight of the polyurethane composition, the fluoropolymer composition comprising at least one fluoropolymer; and
   (c) a polymer carrier, said polymer carrier being a polyolefin, a styrene acrylonitrile polymer, a polystyrene, or combinations thereof, and said fluoropolymer introduced into said polyurethane via said carrier.

2. The polyurethane composition of claim 1, wherein said carrier and said fluoropolymer composition are non-reactive with the polyurethane or components thereof.

3. The polyurethane composition of claim 1, wherein the polyurethane composition comprises said carrier in the amount of 0.2 to about 10 wt. % based on the total weight of the polyurethane composition.

4. The polyurethane composition of claim 1, wherein the polyurethane composition comprises the fluoropolymer composition in an amount of 0.01 to 1 wt. % based on the total weight of the polyurethane composition.

5. The polyurethane composition of claim 1, wherein the fluoropolymer composition comprises a copolymer of vinylidene fluoride.

6. The polyurethane composition of claim 1, wherein the polyurethane is a thermoplastic polyurethane.

7. The polyurethane composition of claim 1, wherein the polyurethane composition contains the fluoropolymer composition in an amount sufficient to produce at least 10% less build-up within an extruder than would be produced using a same polyurethane composition without the fluoropolymer composition.

8. A method of making an article comprising a step of;
   (a) extruding a polyurethane composition from an extruder, the polyurethane composition comprising
     (i) polyurethane,
     (ii) an amount of a fluoropolymer composition that is effective in reducing build-up in the extruder as compared with a same polyurethane composition without the fluoropolymer composition, the fluoropolymer composition comprising at least one fluoropolymer, and
     (iii) a polymer carrier, said polymer carrier being a polyolefin, a styrene acrylonitrile polymer, a polystyrene, or combinations thereof.

9. The method of claim 8, wherein the step of extruding comprises:
   introducing the polyurethane into an extruder, and
   adding the fluoropolymer composition via said carrier to the polyurethane in the extruder.

10. The method of claim 8, wherein the step of extruding comprises:
    introducing a) at least one polyol and b) at least one polyisocyanate into an extruder, and
    reacting the at least one polyol and the at least one polyisocyanate to form a polyurethane.

11. The method of claim 10, wherein the step of extruding comprises adding the fluoropolymer composition via said carrier into the extruder after at least a portion of the at least one polyol and the at least one polyisocyanate have reacted to form the polyurethane.

12. The method of claim 10, wherein the steps of introducing and reacting comprise
    introducing a) at least one polyol, b) at least one polyisocyanate, and c) at least one chain extender into an extruder, and
    reacting the at least one polyol, the at least one polyisocyanate, and the at least one chain extender to form a polyurethane.

13. A polyurethane article comprising
    a polyurethane composition including
    (a) polyurethane,
    (b) a fluoropolymer composition in an amount of about 0.002 to about 3 wt. % based on the total weight of the polyurethane composition, the fluoropolymer composition comprising at least one fluoropolymer, and
    (c) a polymer carrier, said polymer carrier being a polyolefin, a styrene acrylonitrile polymer, a polystyrene, or combinations thereof, and said fluoropolymer introduced into said polyurethane via said carrier.

14. The polyurethane article of claim 13, wherein the polyurethane composition comprises the fluoropolymer composition in an amount of 0.01 to 1 wt. % based on the total weight of the polyurethane composition.

15. A polyurethane composition comprising:
    (a) polyurethane;
    (b) a fluoropolymer composition comprising at least one fluoropolymer, the fluoropolymer composition being present in the polyurethane composition in an amount effective to produce less build-up of polyurethane within an extruder than would be produced using the same polyurethane composition without the fluoropolymer composition; and
    (c) a polymer carrier, said polymer carrier being a polyolefin, a styrene acrylonitrile polymer, a polystyrene, or combinations thereof, and said fluoropolymer introduced into said polyurethane via said carrier.

16. The polyurethane composition of claim 15, wherein the fluoropolymer composition is present in the polyurethane composition in an amount effective to produce at least 10% less build-up of polyurethane within an extruder than would be produced using the same polyurethane composition without the fluoropolymer composition.

* * * * *